United States Patent [19]
Knight

[11] Patent Number: 5,974,725
[45] Date of Patent: Nov. 2, 1999

[54] ONE WAY REMOVABLE LOBSTER GATE WITH CLOSED POSITION LOBSTER ENTRY OPENING

[76] Inventor: Richard S. Knight, P.O.Box 944, Ogunquit, Me. 03907

[21] Appl. No.: 08/883,072

[22] Filed: Jun. 26, 1997

[51] Int. Cl.[6] ................................................ A01K 69/00
[52] U.S. Cl. ..................... 43/100; 43/102; 43/66
[58] Field of Search ............................. 43/100, 102, 103, 43/104, 105, 66, 9.2

[56] References Cited

U.S. PATENT DOCUMENTS

| | | | |
|---|---|---|---|
| 1,619,366 | 3/1927 | Petersen | 43/100 |
| 4,779,373 | 10/1988 | Krenson | 43/66 |
| 4,843,756 | 7/1989 | Wyman | 43/102 |

*Primary Examiner*—Kurt Rowan

[57] ABSTRACT

An extruded plastic one way obstruction gate assembly for use in the lobster fishing industry. A three fingered rotatable tine assembly attachable to an existing circular hoop of the conventional lobster pot or trap. A curved multi-tine gate assures low frontage obstruction to a lobster by providing an opening located between the bottom of the gate tines and the lower portion of a circular hoop off a lobster trap. A bridge is securable to the hoop and the tine assembly snaps in place on the bridge. This tine assembly easily swings upward and is shaped with a void that provides an alternate escape for undersized lobsters while containing the legal size lobster catch within the trap.

20 Claims, 5 Drawing Sheets

ONE WAY REMOVABLE LOBSTER GATE WITH CLOSED POSITION LOBSTER ENTRY OPENING

FIELD OF THE INVENTION

The present invention relates to marine traps and trapping gates. More particularly the field of the marine trap invention relates to a one way, hand removable obstruction gate for attachment to an industry standard coated wire lobster fishing trap.

The lobster gate invention provides tines shaped with an apparent entry opening which invites lobster entry into the trap. Such tines swing away upon touch but do not allow the lobsters to exit from the direction in which they entered. The gate operation is completely quiet, closable by buoyancy/gravity and free from any springs, laches or separate moving elements that might cause a timid lobster to shy away from the trap. The lobster gate apparatus is convertible in the sense that a multi-tine rotatable portion of the one way gate is readily removable from the trap as desired by the user.

EXPLANATION OF TERMS

Certain terms are used to explain the background of the art and the invention; and, for convenience and completeness sake, these terms are summarized in this section. Such terms include the following:

Pot Buoy

The terms marker buoys, pot buoys, and buoys are used interchangeably. They are surface flotation devices which enable a lobster fisherman to locate his traps. Lobster traps are attached to pot buoys with rope, known as line in the marine industry. A lobster fisherman may retrieve his traps from the ocean floor by using the line that is attached to the pot buoy.

Tether.

A tether is a line that is used to attach the lobster trap to the surface floatation buoys. The tether is of sufficient length, to reach from the ocean floor to the floatation device, taking tide fluctuation into account.

Lobster Trap

A rectangular shaped wooden—or today, more likely a plastic coated wire mesh—box placed on the ocean floor and tethered to a surface buoy for location and retrieval. The trap box is internally configured with a series of inwardly tapering funnels, each terminated at the small end with a ring or hoop. The industry uses the term lobster pot interchangeably with lobster trap. For purposes of describing this invention, the term lobster pot, or simply, pot, will be used hereafter.

Kitchen

The lobster pot is divided into two major compartments. The kitchen is the first and larger of these compartments.

Parlor

The second of two compartments within a lobster pot. The parlor may only be reached by passing through another funnel which leads the lobster from the kitchen.

Hoop(s)

In a standard lobster pot, there are three hoops. These hoops include two larger hoops for the entrance funnels and a final smaller hoop in the compartment that leads from the kitchen into the parlor, or parlor hoop. This smaller parlor hoop is physically a nominal five inch aluminum ring terminating at the small end of the mesh funnel leading from the kitchen to the parlor. In one embodiment of my invention, I have installed my one way gates on hoops at both of the entrances and in the parlor hoop, as well.

Heads

Lobster pots are configured with two entrance funnels referred to as fishing heads. These funnels normally provide lobster entry into the trap, and are formed by cord netting that tapers inwardly toward the interior of the trap. Heads are located on either side of the traps. The heads in my invention may include smaller-sized hoops equipped with my one way gate, or may include standard-sized heads equipped with suitably spaced, multi-tine one-way gates of my invention.

Hog Rings

A semicircular malleable, steel or aluminum, metal wire ring often used in the upholstery industry. The rings are closeable by compression with a specially designed pair of pliers. Such rings of various types are standard in the lobster fishing industry for fasteners of various trap hinges and on other trap locations. In my invention a bridge of my gate may be fastened to the hoop by such hog rings or by any other suitable clips or bands.

Multi-tine Gate Assembly

A multi-tine gate, preferably of slightly negative buoyancy molded plastic that is removable, is attachable to the entrance hoops and/or the parlor hoop. The tine shape and spacing relative to the circular hoop allow an inviting entrance to a lobster and yet blocks lobster exit from the trap. The slightly negative buoyant plastic tine assembly seats in a plastic hinge that is attached across an upper chord of the hoop such that the tines immediately and quietly swing away—inwardly and upwardly—upon being brushed by an entering lobster. The gate is thus both quiet and unobtrusive and does not cause a timid lobster to shy away from the pot.

Bridge

A molded plastic apparatus for permanent attachment to the parlor/entrance hoops. This molded bridge has integrally formed therewith receiving and stop clips suitable for pop in and pop out of a one-way tine assembly. The bridge also preferably has a directional tab molded therein in order to define the entrance and blocked exit direction for the tines. Angled arms on the bridge fit across a chord of a head hoop, which hoop drops into grooved detents in the rear of the arms in order to define the correct positioning for the bridge on the hoop. Such positioning and the selected tine length determines an entry opening under the tines and the proper sized escape route for shorts, or non-legal sized lobsters.

Multi-Finger/Tine, One Way Gate

An obstruction apparatus that is installable and removable from a bridge securable to a circular hoop. The bottom of the spaced gate tines relative to the bottom of the hoop defines an opening that invites the lobsters to pass one way only into the trap interior as the gate swings away. This gate, dropping back in place, does not allow the lobster to exit the trap through the tunnel entrance(s). My preferred gate embodiment includes three spaced and curved tines but four or five-tine gates each shaped relative to the bottom arc of a circular hoop are equally within the scope of my lobster trap invention.

Pop in/ Pop out

The act of manually and removably seating/removing the tine assembly into/from the bridge that has been attached to a hoop of a lobster gate.

Running the pots—Haul and Soak

The fishing operation wherein the lobster fisherman motors up to each marker buoy. This operation could be every day, or once every several days. The act of retrieving the lobster trap from the ocean floor to the boat using the tether is a haul, and the amount of time the trap is physically in the water between each hauling operation is called a soak.

Shorts

Lobsters that are smaller in size than the legal limit. Shorts may escape through alternate escape slots provided in the trap or, depending on size, may escape under the shortened center finger(s) of the three to five tine gate.

BACKGROUND OF THE INVENTION

Lobster fishing methods have now become state and federally regulated. The principle state regulations dictate the specific size range of lobsters which may be taken. For example, certain specific size openings have now been mandated to allow for the smaller lobsters to escape should a trap be lost. Seasons, of course are also regulated.

The Federal Government, at the urging of environmental activists, are now even proposing breakaway buoys and lineless traps to save the right whales. Such regulations and controls cut into the profits of lobster fisherman, and thus improvements must be made in the fishing gear and fishing methods for trapping lobsters. This invention relates to new and novel improvements in an age-old art.

Lobster fishing methods have evolved over several decades to the present art of using current technology materials such as plastic coated wire metal traps, positioned on the bottom of the ocean floor and tethered to surface buoys. The age-old design of the lobster trap is based on the lobster's inherent instinct to crawl. Lobsters are not swimmers, and the traps of today and this invention rely upon the natural and inherent crawling nature of lobsters.

A rectangular lobster trap includes a series of netting funnels with ring type openings through which the lobster proceeds until he becomes trapped by failure to readily crawl to an escape route. Conventional lobster pots generally include two major tandem compartments, with the first compartment being called the kitchen, and the second and final trap compartment being called the parlor. The kitchen usually has two, or perhaps more, entrance funnels each provided with terminating circular hoops. These entrance funnels and hoop assemblies are called heads.

The hoops for such entrance heads are nominally about seven or so inches in diameter. The lobster is lead into these compartments by the scent of herring in a bait bag normally located at the junction of the two heads. That bait bag is normally located in the kitchen at the junction of the entrance heads. After the lobster passes through an entrance head and into the kitchen, it must transit a third mesh funnel which terminates at a smaller hoop in the parlor. A simple maze has thus been established in the pot.

Lobster trapping is quite unlike other marine animal trapping techniques—particularly the crab trapping industry. Indeed, the trial and error developed methods have shown that the best chance of trapping the desired size lobster is though a series of funnels and hoops with the expectation that the lobster will have difficulty finding his way back out through the maze. The lobster maze prevents an inadvertent lobster escape because, the theory goes, the lobster cannot readily retrace his path through the maze before the lobster fisherman returns to run the pots after a soak.

However, in point of fact, many lobster fisherman think that many lobsters do escape. Additionally my research has shown that a sizable percentage of trapped lobsters may indeed escape backward through the hoops and funnels. When such escapes occur prior to the lobster fisherman returning to haul his traps, the final catch is reduced.

This escape loss may be sizable. In some of my tests, for example, as many as fifteen lobsters were kept in a trap equipped with my gate; but in a similar situation without any gates on the same type trap only two lobsters were finally trapped. Although my test situations did not conclusively provide proof that final catch increases were due solely to my lobster techniques, it is my strongly developed supposition from the facts as presented, that my one way gate(s) achieve a major improvement in lobstering.

Lobsters are also different from other marine animals in their activity levels. Thus, as a further compounding factor, lobsters vary in activity depending on environmental factors of tides, ocean temperature and current changes. Additionally, the molting seasons of the lobsters causes activity changes as well. These crustaceans are at times very sluggish and lethargic, and at other times are very active, somewhat predictively so.

Such activity changes—especially on the East Coast—can occur overnight based, for example on water temperature changes. During the more active times and conditions, in addition to feeding more aggressively, the lobster is more likely to find his way out of the trap. Thus, in the ideal sense, the lobster fisherman would like to have a true one way gate that may be installed and then removed as necessary depending upon lobster activity.

Given the variable activity levels of the lobster, the ideal situation would be for the fisherman to include or exclude a minimal resistance one way trap at the discretion of his fishing instincts and knowledge. My invention fulfills that need by providing a one way gate which is virtually undetectable upon lobster entry, is easily and manually removable at will by the fisherman, and obstructs any legal-sized lobster from exiting the trap proper.

Accordingly, I herein present a solution—long sought after; but, never-before developed—to a heretofore unsolved lobster trapping problem. I teach and claim one or more truly inviting entrances in a conventional type lobster trap having blocked escape gates. A vastly improved lobster catch is the final result.

Prior to this invention, there had been no one way lobster gates which would exclusively prevent legal-sized lobsters from escaping. My invention when several gates are employed, for the first time, provides a lobster trap that is silent in operation, has very little obstruction to a crawling entry and has total obstruction which blocks escape for legal sized lobsters—yet allows shorts an escape route.

None of the known prior art teach or suggest the novel and inventive principles of my invention which accomplishes these separate functions in a way not heretofore recognized in the lobster fishing industry.

DESCRIPTION OF PRIOR ART

Turning now to the prior art, a search has revealed various patents, several of which are only of peripheral relevance. Such patents include:

U.S. Pat. No. 4,905,405 to Hendricks (Mar. 6, 1990).
U.S. Pat. No. 5,357,708 to Peters et al, (Oct. 25, 1994).
U.S. Pat. No. 5,168,653 to Wyman et al, (Dec. 8, 1992).
French patent 2,691,612 (1975)

Each of these reference patents will be discussed briefly in order to point out the lack of relevance to this invention.

U.S. Pat. No. 4,905,405 to Hendricks on Mar. 6, 1990 discloses a crab trap. While Hendricks presents a one way closure device using fingers mounted top and bottom of an entrance port, it is simply not applicable to lobster fishing. First, his fingers are individually rotatable, hence presenting a difficult series of obstructions which would prevent a lobster from entering the trap. In fact, given a lobster's anatomy with long antennae, the Hendricks device would render his device inapplicable to the lobster fishing industry.

Further, in the configuration shown by Hendricks, there is no teaching of shapes that assist in access and increase the probability of the catch. Additionally, there is no variation in finger length to provide a partial opening for the escape of smaller lobsters and shaped openings to invite lobster entry into the trap.

Peters et al, U.S. Pat. No. 5,357,708 (Oct. 25, 1994). The Peters et al device is an aquatic trap with rotatable apparatus triggered by the physical forces due to the retrieval operation. Peters et al has an additional objective of a hingeable opening in his trap for ease of removal of the catch following retrieval.

The Peters et al device is for trapping crab and fish, and again, is totally inapplicable to the lobster fishing industry. His hinged door and funnel assembly 42 is neither intended nor designed to be triggered or operated by the fish or crab. It's purpose is for human access following retrieval.

Wyman et al, U.S. Pat. No. 5,168,653 (Dec. 8, 1992). The Wyman device has similar characteristics to Hendricks and presents multiple fingers, but uses flexible multiple fingers as the closing means. His trap and apparatus are designed specifically for crab fishing which is a much more aggressive crustacean and the Wyman design simply is not at all suitable for lobstering.

The French patent 2,691,612 (1975) is only of peripheral interest and is aimed at the crab and fish trapping industry, with multiple doors of such construction and operation as to totally preclude lobster fishing. Such flat surface doors of the French patent would be very susceptible to current and wave action and would not at all allow a lobster access into the trap. In short, this reference simply is not relevant to my invention.

Further, my low resistance, one way obstruction gate may be added or removed by hand at the discretion and instincts of the lobster fisherman depending on his assessment of the environmental fishing conditions he perceives while running his pots. Simply stated, the prior art applies to the crab or fish industry. Lobster fishing trap requirements are totally and uniquely different.

In fact, none of the cited art teaches or suggests a low resistance one way removable gate with the novel features of the snap in place and a sized opening for the escape of smaller lobsters. Nor do they demonstrate the attributes of a unique, curved shape so as to provide ease of entry and at the same time avoid impaling the lobster should it attempt to back out when partially entering the hoop.

Moreover, none of these references teach or suggest a low resistance, removable trap door which can be added or taken away from the trap by a simple snap on snap off operation; an addition or subtraction which can be done in an instant and at the discretion of the lobster fisherman as he hauls his pots.

SUMMARY OF THE INVENTION

It is known to use certain horizontal fingers and hinged gate apparatus to prevent fish or crabs from exiting traps. This invention, in contrast, provides and teaches a manual, field installable one way obstruction gate having uniquely shaped curved vertical tines defining a bottom opening that specifically enhances entry into lobster pots, while blocking all exit for legal sized lobsters.

The one way obstruction gate is further designed with an attachable bridge, which bridge is permanently affixed to the industry standard lobster funnel hoop(s). This specially designed bridge receives a pop in/pop out, one way multi-tine obstruction gate for hand operated, field installation or removal.

More specifically, the invention relates to a method and apparatus for attaching a one way obstruction gate assembly to the entrance hoop of a standard lobster pot. Further, the gate assembly is configured with a three fingered gate mounted in such a manner that the gate can only pivot in one direction.

In summary, my invention is specifically designed for lobster fishing and improves the quantity of catch with the time tested lobster pot equipped with an inviting entry opening but an obstructed exit. Indeed, such a time tested pot takes on new and non-obvious characteristics when equipped with one or more of my one way, multi-tine gates shaped relative to the lower bottom arc of a circular hoop to invite lobster entry.

OBJECTS OF THE INVENTION

It is a object of the invention to maintain a one way gate in a near upright position in a lobster trap, or pot.

It is an object of the invention to provide a one-way gate which will operate with the lobster pot oriented somewhat off level.

It is an object of the invention to provide a hand operable pop out means of removal of a multi-tine obstruction gate for a lobster pot.

It is an object of the invention to a provide an efficient pop in installment for such a multi-tine hoop gate for a lobster pot.

It is an object to provide a plastic bridge for permanent attachment to hoops available on standard type lobster pots.

It is an object to provide a plastic rotatable one way gate within the vertical plane of the hoop on a lobster pot.

It is an object to provide a low resistance upwardly swinging multi-tine hoop gate that is primarily lifted by its own buoyancy once touched by lobster entry in an opening provided between the bottom of the gate tines and the hoop to which the gate has been installed.

It is an object to provide a multi-tine hoop gate with a removable tine assembly for a gated lobster trap.

It is an object of the invention to provide an attachment method so that the tine assembly may be snapped on/off an installed hoop bridge for repeat usage at will by a lobster fisherman.

It is an object of the invention to use material of near neutral buoyancy in the water but slightly heavier than the water it displaces so that its natural location is in an entry-ready condition with an entry opening formed between the bottom of the tines and the bottom arc of a circular hoop on a lobster trap.

It is an object of the invention to provide a small predetermined opening formed at the lower portion of the tines for the escape of shorts, or non-legal size lobsters.

It is an object to provide curved edges to downwardly depending tines to promote ease of lobster entry while avoiding any chance of impaling a timid lobster should it attempt to back out a gated hoop.

It is an object of this invention to use a multi-tine near buoyant plastic gate for reduced entry resistance to a lobster entering a conventional two compartment lobster trap.

It is an object of this invention to use a translucent plastic for less visual obstruction to a lobster.

It is an object of a three finger gate to be self tending during trap deployment.

It is an object of this invention to allow hauling and baiting of the lobster traps without repositioning or removing the gate.

It is an object of this invention to readily provide a replacement tine assembly should a gate be damaged in use.

DESCRIPTION OF EMBODIMENT(S)

Figure 1:
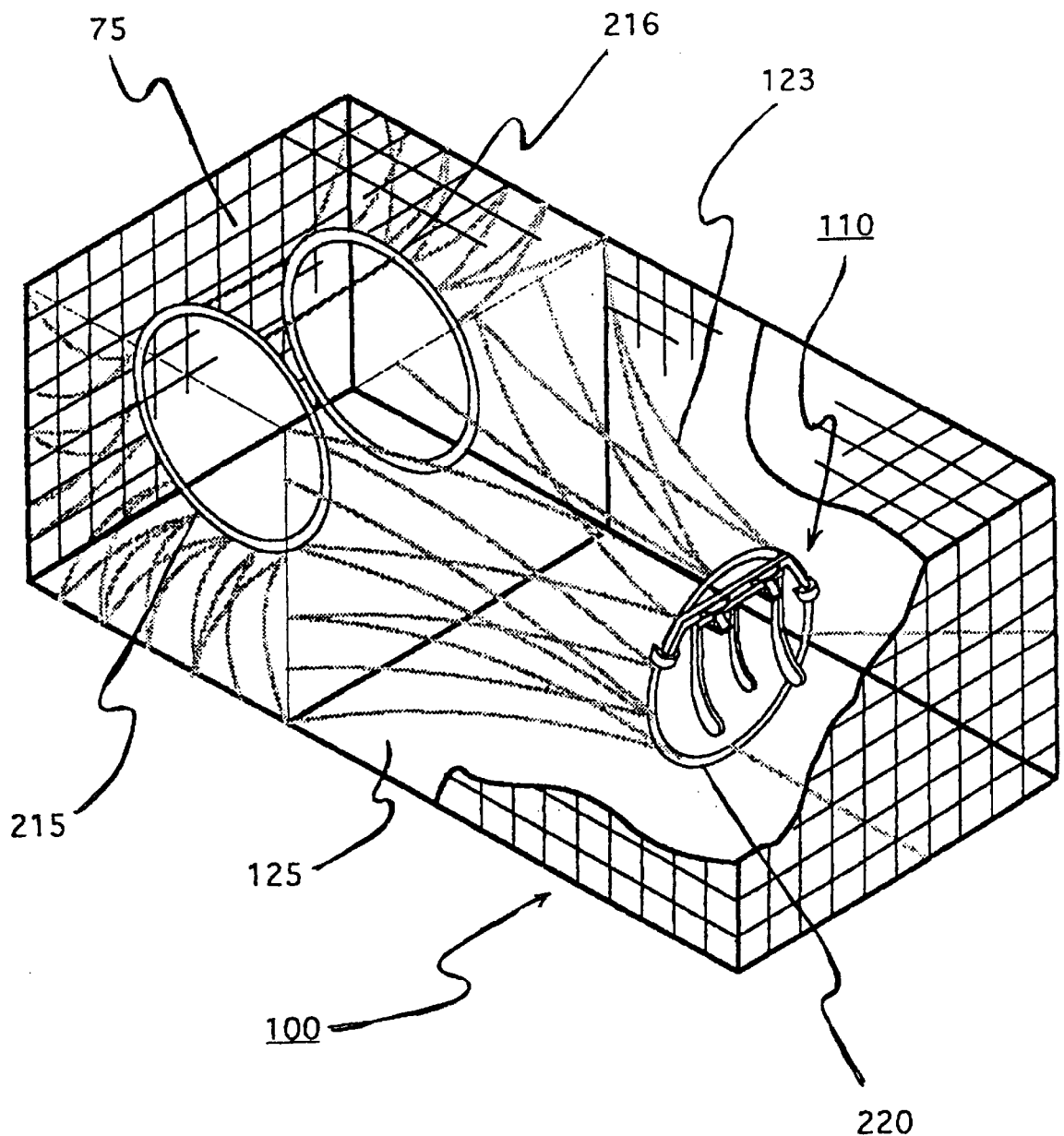
FIG. 1 is a perspective view of a conventional lobster pot equipped with a one way gate in the hoop for the parlor head.

Turning now to FIG. 1, a perspective view of one embodiment of the invention is shown. In FIG. 1, a convention style wire mesh trap 100 is shown having two entrance funnels with inwardly directed mesh in the kitchen compartment 75. The trap 100 further includes a parlor compartment 125. Bricks or other types of weights are placed therein so that the trap lands right side up. On a level ocean floor, a crawling lobster has a slightly uphill crawl to get into the trap through the entrance heads.

In this embodiment of FIG. 1, please note that the entrance heads are of the conventional style in that no gates are located on the entrance hoops 215 and 216. In a conventional style pot, those heads allow lobsters into the kitchen compartment 75 where a bait bag—normally of herring or some other similar bait, is located at the junction of those heads. Lobsters that get some bait often, the theory goes, crawl into the parlor to enjoy the bait. Once in the parlor, such lobsters become trapped by the tunnel network, or maze, as we have called it. Located in the parlor head 123 of FIG. 1 is a three-tine gate 110 of my invention.

Figure 2:
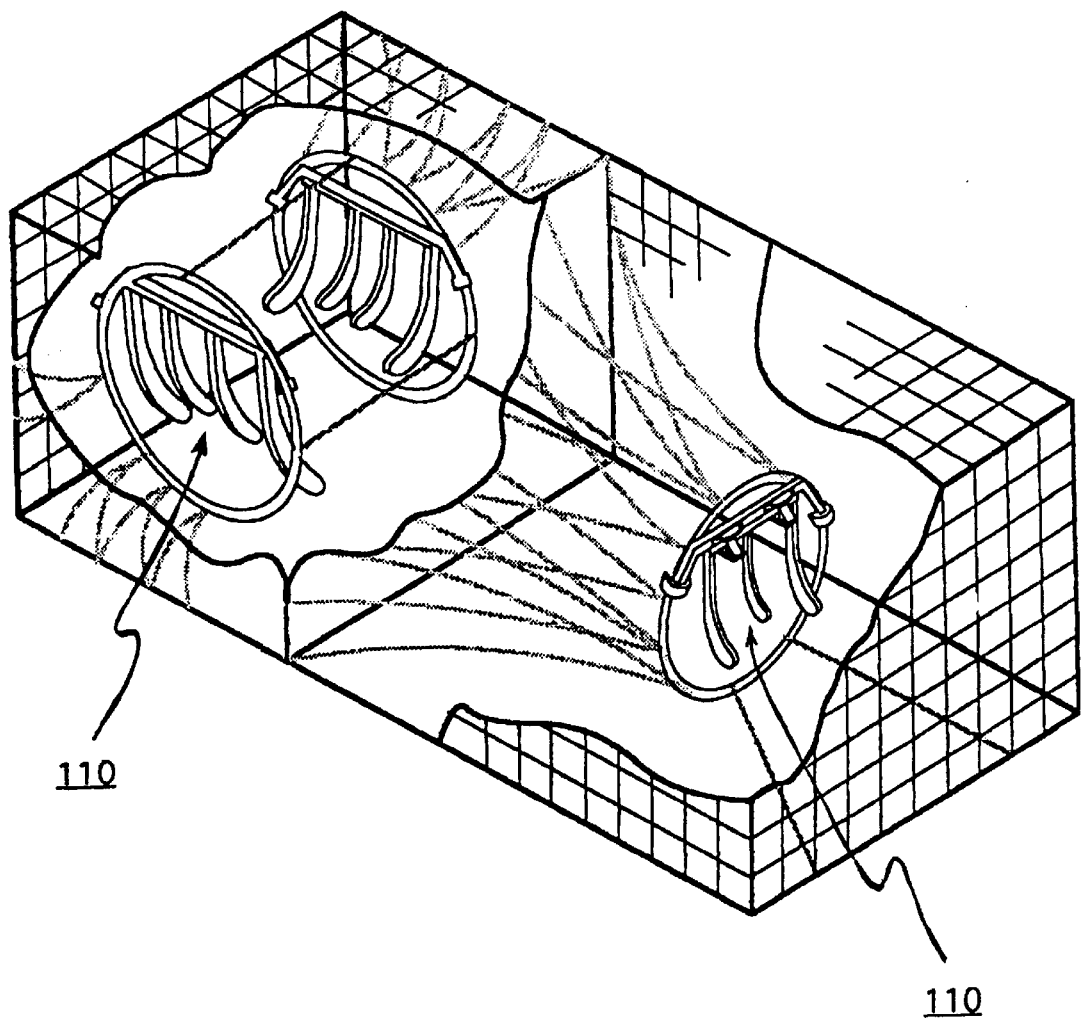
FIG. 2 depicts a similar view as FIG. 1 except having three one way gates at each of the two entrance heads and the parlor head.

FIG. 2 is a trap of somewhat conventional design except that I have equipped such a trap with my one way gates at all three hoops—both of the entrance heads and the parlor hoop as well. The entrance heads often have hoops of a larger diameter than the parlor head. Gate 110 is thus equipped with four—or, perhaps, five tines—as the proper size for entry heads in order to provide proper spacing between the individual tines. Irrespective of the number of tines, however, such gates are all essentially the same in that the tine assembly is seated in an attached bridge, is removable at will, and defines an inviting opening at the bottom arc of a circular hoop in order to invite lobster entry into a trap.

Figures 3, 3A:
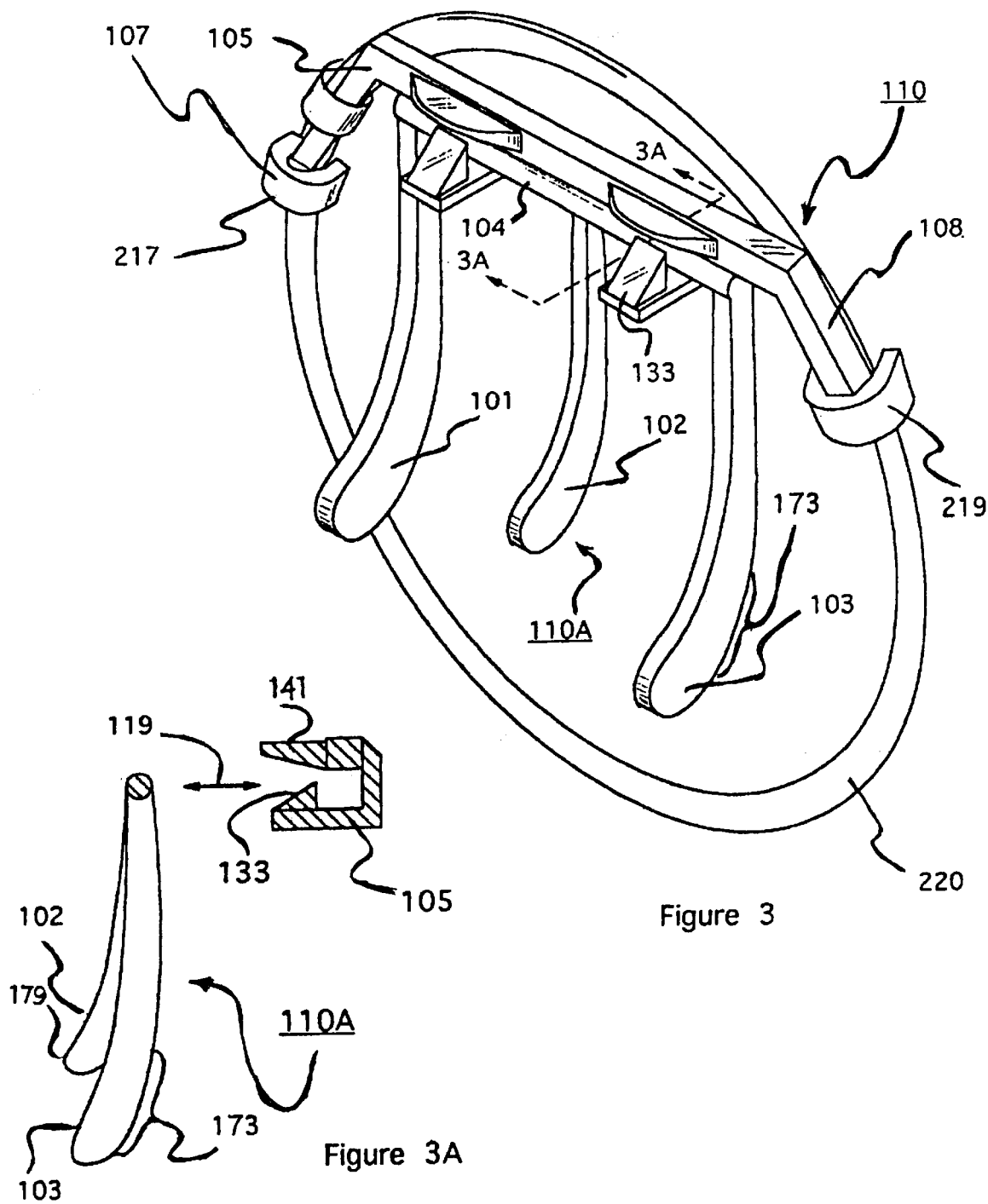
FIG. 3 includes FIG. 3A with FIG. 3 depicting a rear perspective view of a three-tine one way gate having curved tines and a bridge attached to a head hoop.
FIG. 3A is a cross sectional view of a snap assembly having the tine assembly snapped out as best shown by double-headed arrows 3A—3A.

My gate 110 is shown in more detail in FIG. 3 wherein the three-tine gate 110 is shown fastened to a parlor hoop 220 (shown without the funnel net for clarity purposes). Gate 110 comprises two molded plastic assemblies, namely, bridge 105 and tine assembly 110A. These assemblies are advantageously made of a polycarbonate plastic material selected to have a slightly negative buoyancy relative to sea water.

For example, such polycarbonate plastics have a specific gravity of between about 1.2 and 1.5, and thus are heavier than the displaced sea water. The brush of a lobster entering into the trap causes the tines assembly to swing inward and upward to allow the lobster unimpeded entrance into the trap. Tine assembly 110A will, by gravity, self-return to lie in a normally closed position in the plane of hoop 220.

Assembly 110A includes longer side tines 101 and 103 and a shorter center tine 102. Note the tine lengths define a entry opening 225, FIG. 4, between the bottom arc of hoop 220 and the end of tines 101, 102 and 103. A lobster with his antennae would think that opening 225 is an entry opening and would sense very little, if any, obstructions to entry for bait. The spacing and curved tines also contribute to the unimpeded access design of my gate.

Figure 4:
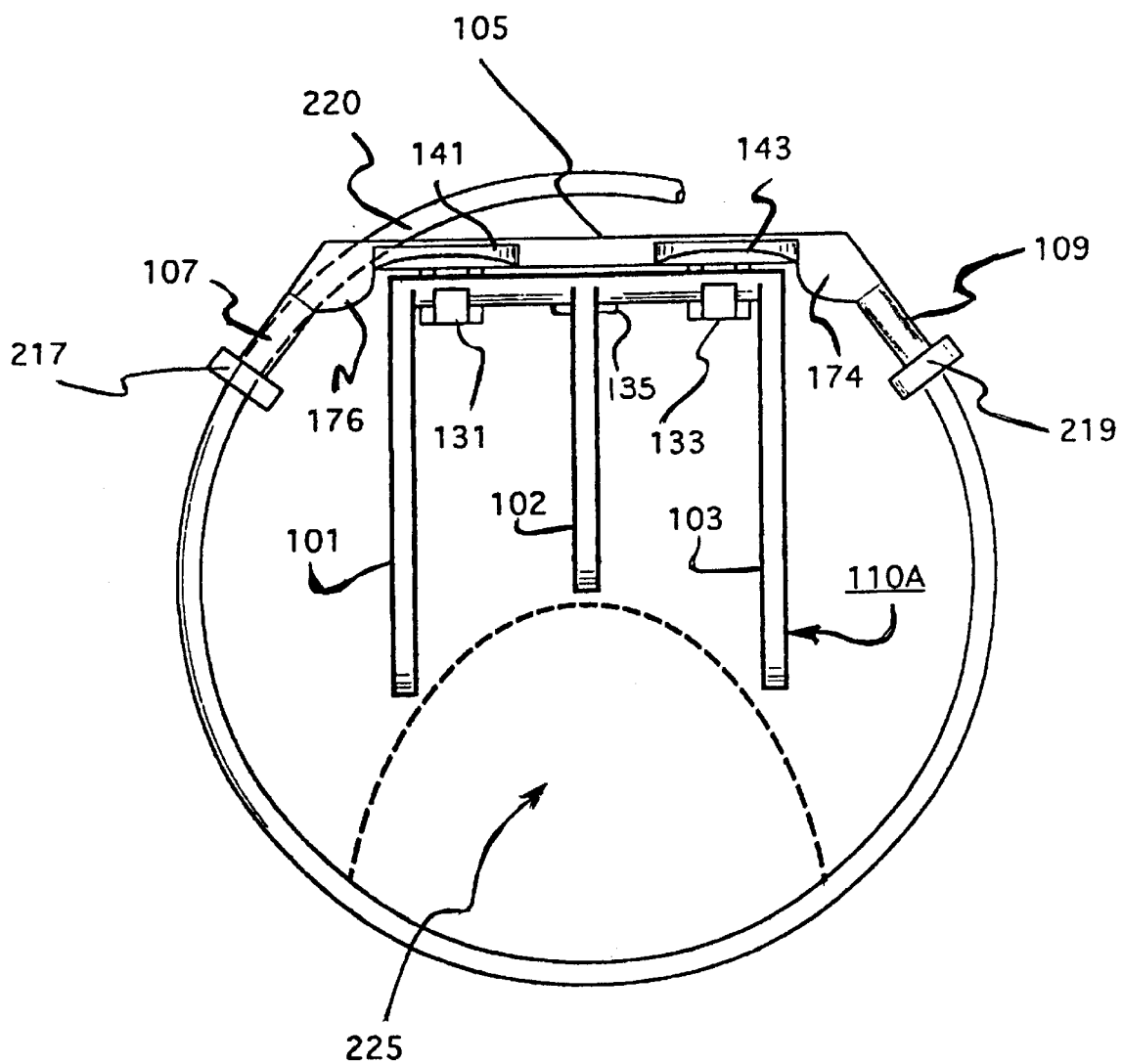
FIG. 4 depicts a plan view of the three-tine embodiment of FIG. 3.

Bridge 105, FIGS. 3 and 4, has two integral, opposing and downward-angled extension arms 107 and 109, each terminating in an overlay tab 217 and 219, respectively. Bridge 105 spans across an upper chord position of hoop 220. These fastener tabs 217, 219 on the rear side are molded with a groove of diameter and depth sufficient to overlay and partially seat around the hoop 220. (Please see the enlarged circle 295 of FIG. 5).

The downward angle arms of bridge 105, when the gate 110 is properly positioned on an upper chord across hoop 220, properly position the bridge at the desired chord location. The dimensions of my gate 110 are selected such that once properly positioned, the arc 225 of proper size is defined by the lower portion of hoop 220 and the bottom of the tines of tine assembly 110A.

Figure 5:
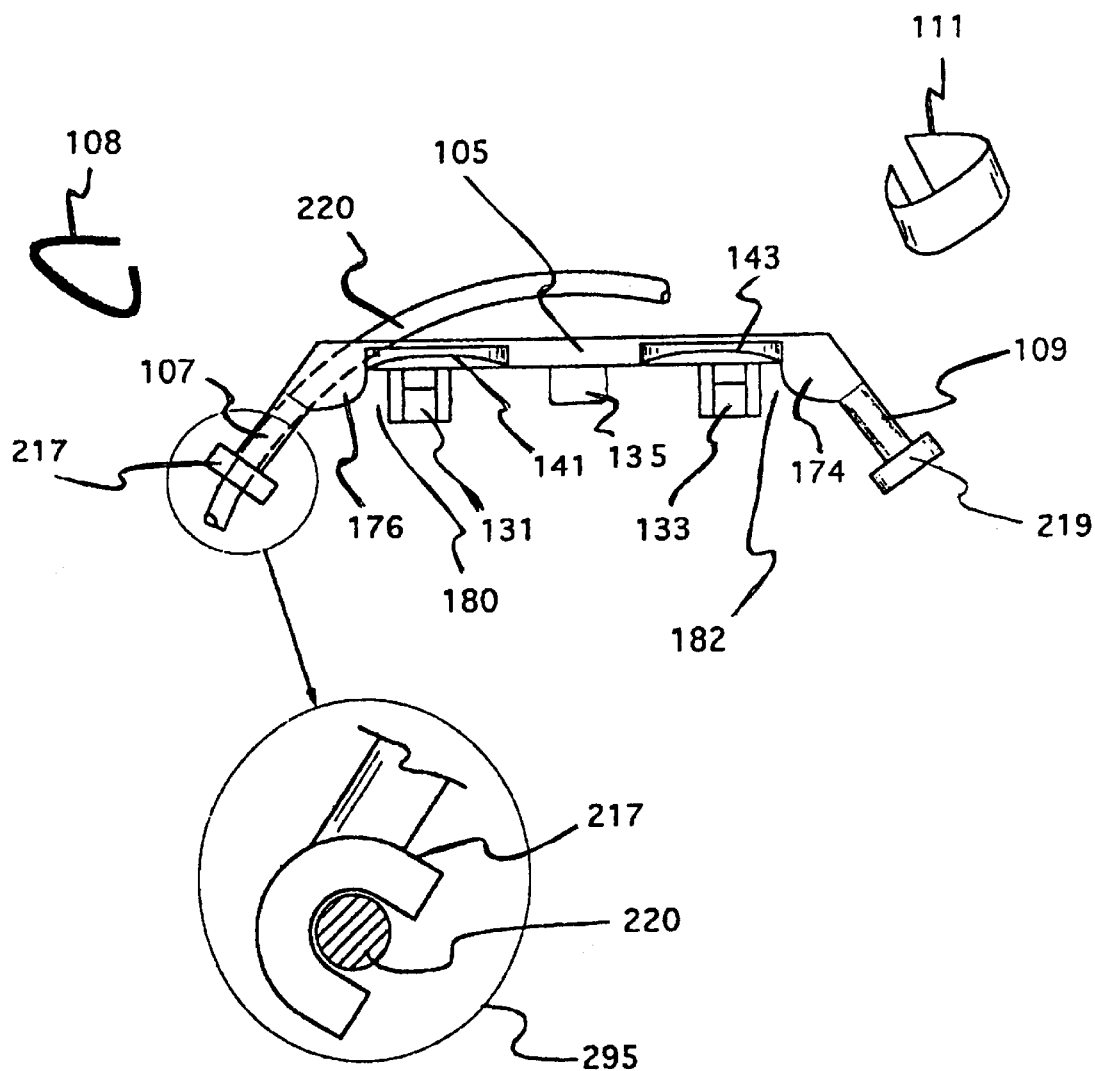
FIG. 5 depicts a bridge plan view as applicable for the gate of FIGS. 3 and 4.

Tabs 217 and 219 are attached to hoop 229 by any suitable fasteners, such as hog rings 108 and/or bands 111, FIG. 5. Such fasteners provide for an essentially permanent attachment to hoop 220 since the bridge portion stays on the hoop whether or not the tine assembly 110A is snapped in or out.

Referring now to FIG. 5 the bridge is shown in a larger scale with an enlarged detail for clarity purposes. Also shown in FIG. 5 is a pair of upper swing stops 141 and 143 that protrude directly out from the plane of the paper in that Figure. These swing stops 141 and 143 guide the hinge bar 104 into place over the snap ramps 131 and 133. As shown in FIG. 3A, the lower surface of upper stop 141 defines an upper guided ramp that assures a positive snap and hinge for the cross bridge portion of tine assembly 110A. Moreover such stops 141 and 143 act as guards to prevent a lobsterman from accidently breaking off tabs 131 and 133 during loading, baiting or emptying the trap 100.

Stops 141 and 143 also restrict the total amount of upward swing movement of tine assembly 110A during lobster entry through the gate 110. After hitting stops 141, 143 the negative buoyancy of tine assembly 110A lets it settle back into a normally closed condition to block lobster exit from trap 100. FIGS. 1 and 2.

FIG. 3A also shows a side cross sectional view of the way in which the tine assembly 110A snaps into and then may be snapped out of the bridge 105, FIG. 3. Tine assembly 110A, as shown for example in FIG. 3, includes three downward tines 101, 102 and 103 all depending from, and integrally molded with, a cross piece hinge bar 104. The entire assembly 110A, as earlier described, may be snapped in and out by the lobster fisherman. FIG. 3A shows a side view of the bridge ramp snap 133, 141 with the tine assembly 110A removed as shown symbolically by double-headed arrow 119.

Bridge 105, FIG. 5, is equipped with a pair of snap ramps 131 and 133 equally spaced inboard from shoulder areas 174 and 176 of arms 107 and 109 as best shown in FIG. 5. Between ramps 131 and 133 is a limit tab 135, which tab limits the amount of back swing of tines 110A. Thus as tines 110A swing inwardly, at an upper limit the center tine 102 strikes the lower edge of limit tab 135 and cannot swing any higher. FIG. 4 also show that limit tab 135 protrudes below the cross piece of tine assembly 110A.

Bridge 105 has further molded outwardly extending curved, angular stops 141 and 143 positioned inboard from arms 107 and 109 and further positioned above snap ramps 131 and 133. Ramps 131 and 133 in conjunction with angular stops 141 and 143 provide the receiving and rotation-stops for a three fingered subassembly 110A.

Bridge assembly 105 further has molded shoulders 174 and 176 which create lateral stops for finger subassembly 110A. Further molded therein are a pair of freedom voids 180 and 182 between respective ramp shoulder 176 and ramp 131 and between ramp shoulder 174 and ramp 133 as well. Voids 180 and 182 provide limited, but suitable lateral motion so as to avoid any possibility of binding during operation. Snap ramps 131 and 133 are integrally molded from the bridge material and loosely receive the hinge bar 104 of tine assembly 110A for a free swinging motion.

Turning now to FIG. 3 and tine subassembly 110A, this subassembly is further comprised of two outboard fingers 101 and 103 of a given length and of a centrally located finger 102 of a shortened length. The tines 101, 102 and 103 have an upward curve as the gate swings away. Such a curve both promotes ease of lobster entry while avoiding any chance of impaling a timid lobster should it attempt to back out a gated hoop. It should be understood that a lobster may enter a gated trap many, many time—upward of perhaps a 100 times or so—before he is a "keeper" of legal size. It is essential therefore that such lobsters not think of the gate as a danger so preventing any chance of impalement is critical.

The upward curvature, FIG. 3, near the lower tips of tines 101, 102 and 103 has been selected such that the bowed shape 173, FIG. 3 and FIG. 3A, of each tine rides tangentially on the lobster shell as the gate swings to horizontal during lobster entry. During my research I noted instances of lobsters entering partially into the gate and then retreating away from any further entry. Such tangential contact at bowed shape 173 allows the lobster to back away without any chance of impalement. Thus, the lobsters will not fear the gated trap and will return again and again for feeding until they are of legal size.

All three fingers 101, 102 and 103 are top molded orthogonally to cylindrical hinge bar 104. Hinge bar 104 is of a fixed diameter between each of the fingers 101, 102, and 103 and of suitable diameter to snap over the ramps 131 and 133, and under limit stops 141 and 143 in bridge assembly 105. All fingers, when viewed frontally, are selected with lengths that together exhibit an inward curvature to further reduce the appearance of obstruction to the lobster. Likewise, the shorter, center finger 102 is of similar curvature as the outer tines but it has tip 179 set further inwardly than the two outboard fingers 101 and 103 as shown clearly in FIG. 3A.

As shown best, perhaps by comparing FIG. 3A with FIG. 3, sub assembly 110A "snaps" loosely into bridge 105, thereby providing a completed free swinging obstruction gate assembly 110. In keeping with lobster trap designs, the entire gate 110 is configured for ease of installation with the critical rotating tine subassembly 110A being hand removable and hand replaceable at the will of the lobster fisherman.

While my invention has been described with reference to a particular example of a preferred embodiment, it is my intention to cover all modifications and equivalents within the scope of the following claims. It is therefore requested that the following claims, which define my invention, be given a liberal interpretation which is within the spirit and scope of my contribution to this art of lobster fishing.

What is claimed is:

1. A self supporting, removable, multi-tine gate which is hand attachable to a circular terminating hoop on a lobster entrance funnel of an industry standard conventional lobster fishing pot for trapping legal sized lobsters and allowing for the escape of shorts, or non-legal sized lobsters, said gate comprising:

a bracketing bridge securable across a top chord of said circular hoop;

a hand removable multi-tine one way rotational obstruction gate having at least three downward depending tines only, with such tines having curved lower tine ends and including longer outer tines and a shorter inward tine(s) formed in a tine assembly on a rotational top hinge bar and shaped such that the lower curved tine ends together with a bottom arc of said circular hoop form an upward arched lobster entrance/exit opening;

means for easily hand attaching or removing said tine assembly with swinging freedom to said bracketing bridge; and said rotational obstruction gate having inwardly curved tines and a small negative buoyancy relative to ocean water so as to react to a lobster touch by swinging inwardly away from the bottom of said circular hoop in response to lobster entry through said entrance/exit opening, yet allowing non-legal-sized lobsters to escape through said arch shaped opening while blocking the exit of legal sized lobsters.

2. A gate assembly in accordance with claim 1 wherein said tine assembly is further characterized by comprising:

an entry opening defined by longer side tines and a shorter center tine to enhance lobster entry through said entrance opening formed by the curved tines and a bottom arc of said circular hoop.

3. A gate assembly in accordance with claim 1 wherein said bracketing bridge is further characterized by comprising:

means fastening said bracketing bridge across a top chord of said circular hoop.

4. A hand removable rotational one way gate having at least three tines and being attachable to a bracketing bridge spanning across an upper chord of a circular hoop in a conventional lobster trap having said circular hoop terminating an entrance funnel on said trap, said gate comprising:

a tine assembly of negative buoyancy material relative to ocean water and swingably attachable by a rotatable hinge bar to said bracketing bridge when said bridge is installed across an upper chord of said circular hoop;

said tine assembly having downward depending tines only and such tine assembly further characterized by comprising at least two downward outboard tines extending from a rotatable hinge bar and selected with a length appropriate for lying along outer chords of said circular hoop;

a shorter center downward extending tine located between said outboard tines and extending from said rotatable hinge bar; and said tines being inwardly bowed along their length with the terminating ends thereof being inwardly curved and thus providing:

(1) an entry/escape void for initiating lobster entry into said lobster pot between the lower curved tine ends and a lower portion of said circular hoop;

(2) an escape for shorts, or non-legal sized lobsters through said void, when said tine assembly is in a normally closed position in the plane of said circular hoop; and (3) a blocked exit by said tines which prevent legal-sized lobsters from escaping though said entry/escape void.

5. A gate assembly in accordance with claim 4 wherein said bracketing bridge is further characterized by comprising:

compressible ringed loops for fastening said bridge across said upper chord of said circular hoop.

6. A method of configuring a lobster trap having a kitchen compartment in tandem with a parlor compartment with the two compartments interconnected by a net funnel having an opening from the kitchen into the funnel and said funnel terminating in a circular hoop, said method comprising the steps of:

installing, on said circular hoop of said trap funnel(s) a tine gate which gate may be manually snap-in/snap-out removed and reinstalled in the field by hand during lobster fishing operations;

shaping the tines with curved lower tine ends such that the lower curved tine ends together with a bottom arc of said circular hoop form a lobster entrance/exit opening;

forming said entry/exit opening between the bottom of the tines and said circular hoop, with an opening sized large enough to be sensed by lobster antennae as readily admitting entry by a lobster; and hand mounting said gate from the top of said hoop so that the gate swings open upon movement of a legal sized lobster through said gated hoop and yet allows escape of non-legal sized lobsters through said opening with said gate remaining in a closed position.

7. A method of configuring said lobster trap of claim 6, and said method further comprising the step of:

selecting a plastic material of negative buoyancy in ocean water for said gate tine assembly so as to provide minimal resistance in one direction.

8. A method of configuring said lobster trap of claim 6 and said method further comprising the steps of:

combining one or more lobster trap funnels with said one way gated entrances.

9. A self supporting, removable, multi-tine gate which is hand attachable to a terminating hoop on a funnel of an industry standard lobster fishing pot for trapping legal sized lobsters and allowing for the escape of shorts, or non-legal sized lobsters, said gate comprising:

a bracketing bridge securable by fastening across a top chord of said hoop;

a hand removable multi-tine one way rotational obstruction gate having at least three tines formed in a tine assembly with a rotational top hinge bar;

means for removable mounting said tine assembly from said hinge bar by securing said top hinge bar with swinging freedom to said bracketing bridge;

said one way obstruction gate having inwardly curved tines and a small negative buoyancy relative to ocean water so as to react to a lobster touch by swinging inwardly away from said bridge for lobster entry, yet blocking the exit of said lobster; and said bracketing bridge is further characterized by a snap in ramp means and corresponding rotational stop for receiving said tine assembly and providing freedom of swing through a limited inward arc only.

10. A gate assembly in accordance with claim 9 wherein said bracketing bridge is further characterized by a mounting support comprising:

a pair of opposite and downwardly pointing bridge arms indented on one lower edge so as to lay securely against a curved surface of a circular terminating hoop of said lobster fishing pot.

11. A gate assembly in accordance with claim 10 wherein said bracketing bridge is further characterized by a mounting support comprising:

a pair of tabs at the lower outward ends of said bridge arms having grooves for receiving a circular cross section of a ringed circular hoop of the type normally found on a conventional lobster fishing pot.

12. A hand removable one way gate having at least three tines and being attachable to a bracketing bridge spanning across an upper chord of a circular hoop in a lobster trap, said gate comprising:

a tine assembly of negative buoyancy material relative to ocean water and swingably attachable by a rotatable hinge bar to said bridge;

said tine assembly further characterized by comprising two equally spaced outboard tines extending from a rotatable hinge bar;

a shorter center downward extending tine equally spaced between said outboard tines and extending from said hinge bar;

said tines having a length selected to provide both an entry/escape void for initiating lobster entry into said lobster pot through said circular hoop to which the gate is attachable, and an escape for shorts, or non-legal sized lobsters, when said tine assembly is in a normally closed position in the plane of said hoop;

said bracketing bridge is further characterized by:

fastening means for fastening said bridge across said upper chord of said hoop; and a ramped snap means for swingably receiving said tine assembly and providing, responsive to a lobster touch, an inward and upward freedom of swing for said tine assembly.

13. A gate assembly in accordance with claim 12 wherein said bracketing bridge is further characterized by a mounting support comprising:

a pair of opposite and downwardly pointing bridge arms indented on a lower edge of each of said arms so as to lay securely against a curved circular surface of the lobster trap hoop to which said bridge is attachable.

14. A gate assembly in accordance with claim 12 wherein said bracketing bridge is further characterized by:

a return stop positioned between said snap means for limiting the outwardly swinging arc of said tine assembly yet allowing the negative buoyancy of said tine assembly to return said tine assembly to a normally closed position lying essentially in the plane of said hoop.

15. A gate assembly in accordance with claim 14 wherein said bracketing bridge is further characterized by:

a pair of hoop mounting supports, on each on each of said downward arms and comprising grooves for fitting over the hoop while positioning said bracketing bridge at a desired span position on said hoop.

16. A gate assembly in accordance with claim 12 wherein said bracketing bridge is further characterized by:

rotational stops positioned above said snap means for limiting the inward swinging arc of said tine assembly.

17. A gate assembly in accordance with claim 12 wherein said tine assembly comprises:

said rotatable bar is a molded cylindrical hinge across the tops of said tines; and wherein said cylindrical bar is loosely received in said bracketing bridge and bears against said ramp parts only, hence limiting the potential of noise during operation by a lobster.

18. A gate assembly in accordance with claim 12 wherein said gate in a closed position lies in the vertical plane of said hoop and further characterized in that:

said gate tines do not cover the entire cross-sectional area of said hoop; and further wherein said entry/escape opening at the bottom of said tines provides the appearance and/or feel of open space for the lobster to start through said hoop.

19. A gate assembly in accordance with claim 12 and further wherein:

said tines are curved inward, and away from an approaching lobster, and being sufficiently shaped so as to avoid impaling a lobster that attempts to momentarily pull backward from entry through the plane of said hoop.

20. A gate assembly in accordance with claim 12 and further wherein:

said gate assembly is attachable to older or newer lobster pots without the requirement of additional configurations to said conventional lobster pot.

* * * * *